United States Patent
Schuknecht et al.

(10) Patent No.: US 12,305,714 B2
(45) Date of Patent: May 20, 2025

(54) TORQUE TUBE COUPLER

(71) Applicant: ARRAY TECH, INC., Albuquerque, NM (US)

(72) Inventors: Nathan Schuknecht, Golden, CO (US); Robert Jinks, Derby (GB); Graeme Hoste, Albuquerque, NM (US)

(73) Assignee: ARRAY TECH, INC., Alburquerque, NM (US)

( * ) Notice: Subject to any disclaimer, the term of this patent is extended or adjusted under 35 U.S.C. 154(b) by 0 days.

(21) Appl. No.: 18/801,094

(22) Filed: Aug. 12, 2024

(65) Prior Publication Data
US 2025/0060008 A1 Feb. 20, 2025

Related U.S. Application Data

(60) Provisional application No. 63/519,397, filed on Aug. 14, 2023.

(51) Int. Cl.
| F16D 1/08 | (2006.01) |
| H02S 20/30 | (2014.01) |
| F24S 30/00 | (2018.01) |

(52) U.S. Cl.
CPC ............ *F16D 1/0847* (2013.01); *H02S 20/30* (2014.12); *F24S 2030/15* (2018.05)

(58) Field of Classification Search
CPC ........ F16B 7/04; F16B 7/0406; F16B 7/0426; F16B 7/042; F16B 7/0433; F16B 7/0446
See application file for complete search history.

(56) References Cited

U.S. PATENT DOCUMENTS

| 501,918 | A | * | 7/1893 | Caldwell | F16B 7/0413 |
| | | | | | 472/40 |
| 734,509 | A | * | 7/1903 | Caesar | A47B 91/02 |
| | | | | | 4/594 |
| 1,420,670 | A | * | 6/1922 | Schuette | B64C 1/06 |
| | | | | | 403/292 |
| 2,260,811 | A | * | 10/1941 | Kozak | B65G 33/32 |
| | | | | | 198/666 |
| 2,350,582 | A | * | 6/1944 | Booth | F16B 7/0413 |
| | | | | | 403/379.3 |

(Continued)

OTHER PUBLICATIONS

European Patent Office; International Search Report and Written Opinion dated Nov. 26, 2024 issued in Int'l App No. PCT/US2024/042118; 13 pages.

*Primary Examiner* — Daniel J Wiley
(74) *Attorney, Agent, or Firm* — MASCHOFF BRENNAN

(57) ABSTRACT

A torque tube coupler may include a sleeve. The sleeve may include an outer surface, a first opening, and a second opening. The outer surface may be configured to physically engage with portions of internal surfaces of a first torque tube segment and a second torque tube segment. The first opening may be configured to be positioned proximate a first countersunk opening of the first torque tube segment. The second opening may be configured to be positioned proximate a second countersunk opening of the second torque tube segment. The first opening and the second opening may be configured to receive fasteners via the first countersunk opening and the second countersunk opening to couple the first torque tube segment and the second torque tube segment to the sleeve to form a torque tube comprising a flush external surface.

17 Claims, 9 Drawing Sheets

(56) References Cited

U.S. PATENT DOCUMENTS

| | | | | |
|---|---|---|---|---|
| 2,850,304 A * | 9/1958 | Wagner | E04G 7/20 | 411/959 |
| 2,950,015 A * | 8/1960 | Pataky | A47F 5/14 | 403/267 |
| 3,178,210 A * | 4/1965 | Dickinson | E21B 17/22 | 175/323 |
| 3,514,135 A * | 5/1970 | Cooper | F16B 7/0413 | 285/370 |
| 3,547,475 A * | 12/1970 | Gingher | F16B 7/0413 | 403/379.3 |
| 4,344,719 A * | 8/1982 | Thom | F16B 7/0413 | 403/374.3 |
| 4,557,467 A * | 12/1985 | Lin | E04F 11/1836 | 403/292 |
| 4,614,502 A * | 9/1986 | Nelson | A63F 9/088 | 52/645 |
| 4,671,478 A * | 6/1987 | Schoenig | F16M 11/245 | 248/123.2 |
| 4,691,818 A * | 9/1987 | Weber | B65G 33/32 | 198/677 |
| 4,793,040 A * | 12/1988 | Rumberger | F16L 27/053 | 29/525.01 |
| 4,838,831 A * | 6/1989 | Rumberger | F16D 1/033 | 464/182 |
| 5,078,534 A * | 1/1992 | White | F16B 7/042 | 403/379.3 |
| 5,149,149 A * | 9/1992 | Wu | F16B 7/0413 | 403/348 |
| 6,183,167 B1 * | 2/2001 | Ruiz | F16B 7/042 | 405/253 |
| 6,874,971 B2 * | 4/2005 | Albaugh | F16B 2/04 | 403/368 |
| 7,300,059 B2 * | 11/2007 | Caruso | A63B 63/004 | 273/400 |
| 7,618,210 B2 * | 11/2009 | Wagner | E04F 11/1836 | 403/397 |
| 7,717,455 B2 * | 5/2010 | Morris | B60D 1/07 | 280/491.5 |
| 7,722,286 B2 * | 5/2010 | Heald | E01F 9/681 | 403/183 |
| 7,905,677 B1 * | 3/2011 | Erickson | F16B 7/182 | 248/539 |
| 7,938,593 B1 * | 5/2011 | Young | F16B 7/182 | 403/379.3 |
| 8,333,531 B1 * | 12/2012 | Wei | A63B 21/1681 | 403/379.6 |
| 8,371,768 B1 * | 2/2013 | Wu | F16B 7/042 | 403/294 |
| 8,496,296 B2 * | 7/2013 | Fusao | A47C 5/10 | 297/58 |
| 9,016,974 B2 * | 4/2015 | Coote | A63B 21/1681 | 403/297 |
| 10,947,684 B1 * | 3/2021 | Paulin | E01F 13/026 | |
| 11,098,476 B2 * | 8/2021 | Jin | E04B 1/2403 | |
| 11,828,444 B1 * | 11/2023 | Altman | F21V 21/12 | |
| 2005/0008431 A1 * | 1/2005 | Albaugh | F16B 2/04 | 403/368 |
| 2017/0233996 A1 * | 8/2017 | Abernathy | F16B 7/0433 | 52/698 |
| 2018/0062563 A1 | 3/2018 | Bapat et al. | | |
| 2022/0082119 A1 * | 3/2022 | Creasy | F16D 1/0864 | |

* cited by examiner

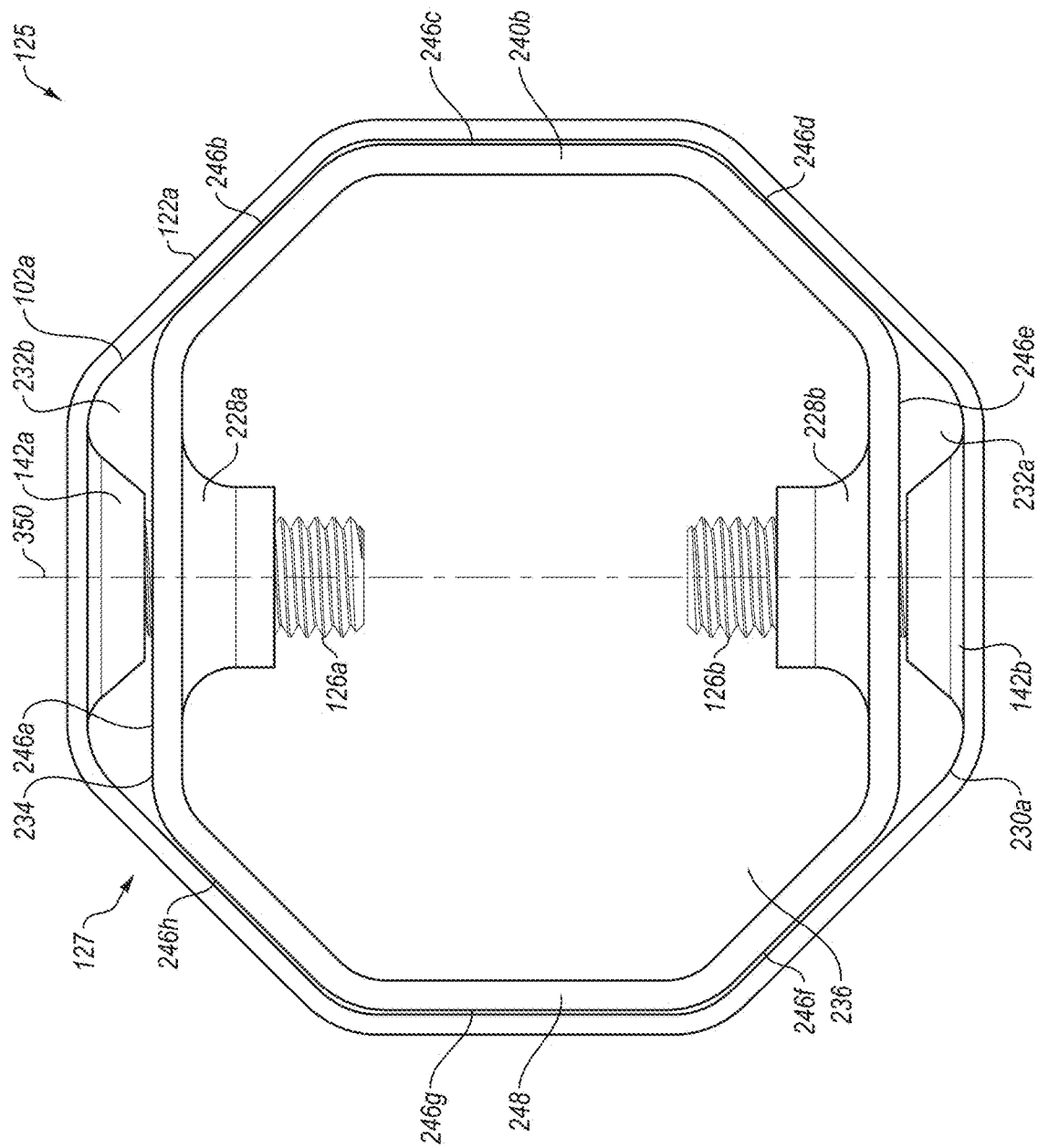

TORQUE TUBE COUPLER

CROSS-REFERENCE TO RELATED APPLICATION

This application claims the benefit of and priority to U.S. Patent Application Ser. No. 63/519,397, filed on Aug. 14, 2023, the disclosure of which is incorporated herein by reference.

THE FIELD OF THE INVENTION

The embodiments discussed in the present disclosure are related to solar installations and, more particularly, to torque tube couplers for use in solar installations.

BACKGROUND

Solar installations including solar farms, photovoltaic (PV) plants, solar tracking systems, fixed solar systems, and other PV systems often include large numbers of PV modules that collect sunlight and generate energy. Typically, multiple PV modules are coupled to a single torque tube. The torque tubes and the PV modules may be arranged in rows at a site where the solar installation is installed. The length of the torque tubes in each of these rows may be significant. Due to the length of these rows, multiple torque tube segments are often coupled together using torque tube couplers to form the torque tubes.

Some torque tube couplers physically engage with external surfaces of the torque tube segments to couple to the torque tube segments. However, because these torque tube couplers physically engage with external surfaces of the torque tube segments that they connect, they create inefficiencies of design and/or manufacturing of the solar installations. This is because the torque tube couplers limit the coupling locations for PV modules, support structures, and other components of the solar installations. For example, limiting the coupling locations for the PV modules and the support structures may limit the locations where support columns may be located within the solar installations, lengths that the torque tube segments may be, or both. Accordingly, there is a need for a torque tube coupler that does not limit coupling locations on torque tubes and avoids inefficiencies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address the problems experienced in solar installations, including problems associated with the torque tube couplers constraining locations where PV modules can be coupled to the torque tubes. In particular, disclosed embodiments provide a torque tube coupler that fits within internal volumes of torque tube segments. The torque tube coupler includes openings that receive fasteners via countersunk openings on the torque tube segments. The fasteners couple the torque tube segments to the torque tube coupler to form the torque tube. The fasteners may include countersunk fasteners that interface with the countersunk openings of the torque tube segments such that the fasteners and external surfaces of the torque tube segments form a flush external surface. Therefore, the torque tube coupler couples to the torque tube segments without physically engaging with the external surfaces of the torque tube segments. In addition, because the torque tube coupler is disposed within the internal volumes of the torque tube segments, the torque tube coupler does not constrain where the PV modules can be coupled to the torque tubes. Thus, the torque tube coupler does not constrain where a torque tube interface can be coupled to the torque tubes, which does not constrain where support columns can be located.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIG. 2D illustrates a cross-sectional view of the example of the torque tube coupler and torque tube segments of FIG. 1;

all according to at least one embodiment described in the present disclosure.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
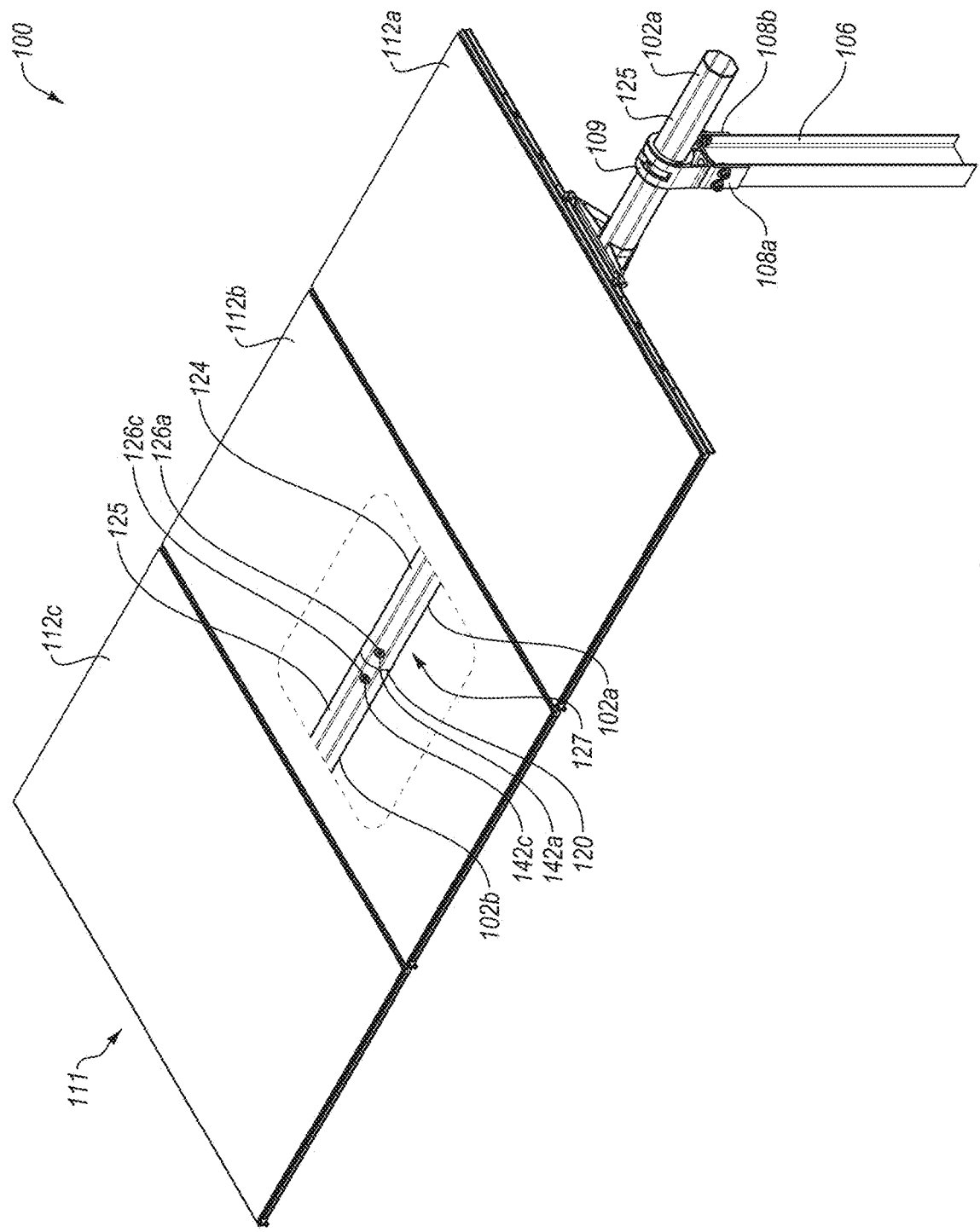
FIG. 1 illustrates an example solar tracking system that includes one example embodiment of a torque tube coupler that connects torque tube segments.

Referring to FIG. 1, an example of one type of system environment in which aspects of the present disclosure might be used is shown. Shown in FIG. 1 is an embodiment of a solar tracking system 100. Although illustrated and described in relation to the solar tracking system 100, it is appreciated that the embodiments described in the present disclosure may be implemented in a solar tracking system, a fixed solar system, or any other appropriate solar system. In the example shown, a single row 111 includes three example PV modules 112a-c and two torque tube segments 102a-b. The torque tube segments 102a-b may be coupled together via a torque tube coupler 127 to form a torque tube 125 that extends a length of the row 111.

A torque tube interface 109 operatively connects the torque tube 125, including the torque tube segments 102a-b, to a support column 106 via mounting brackets 108a-b. The torque tube interface 109 permits the torque tube 125 to rotate to generally orient the PV modules 112a-c towards the sun or normal to the east-west portion of the irradiance of the sun, which may facilitate increased electrical energy generation by the PV modules 112a-c. Alternatively, in a fixed solar system, the torque tube interface 109 may connect the torque tube segments 102a-b to the support column 106 such that the torque tube 125 is stationary (e.g., in a fixed position) to maintain an orientation of the PV module 112a-c. In addition, the mounting bracket 108a-b can be used to secure the torque tube interface 109 to the support column 106.

Figure 2A:
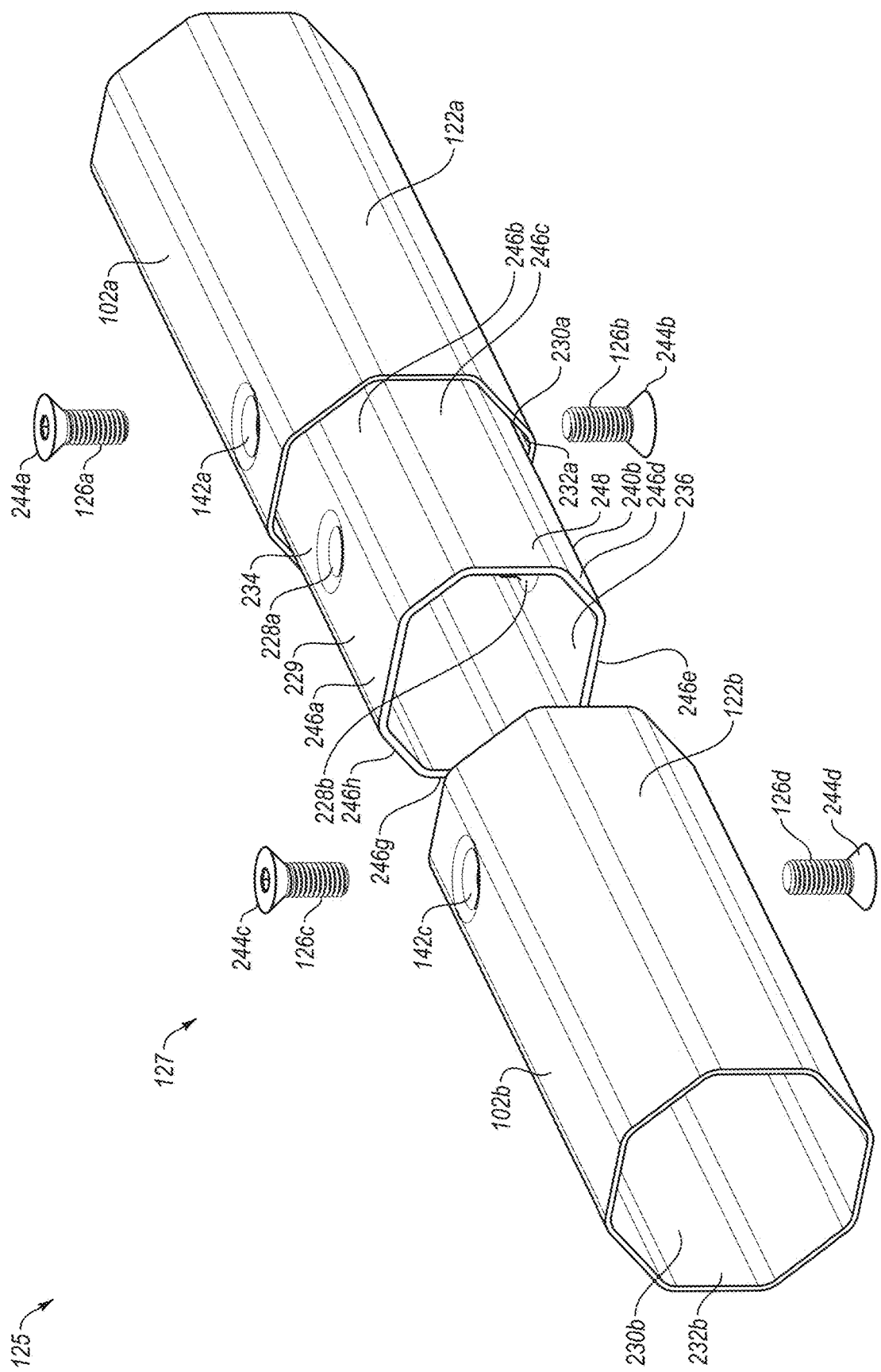
FIG. 2A illustrates a partially exploded top perspective view of the torque tube coupler and torque tube segments of FIG. 1.
Figure 2B:
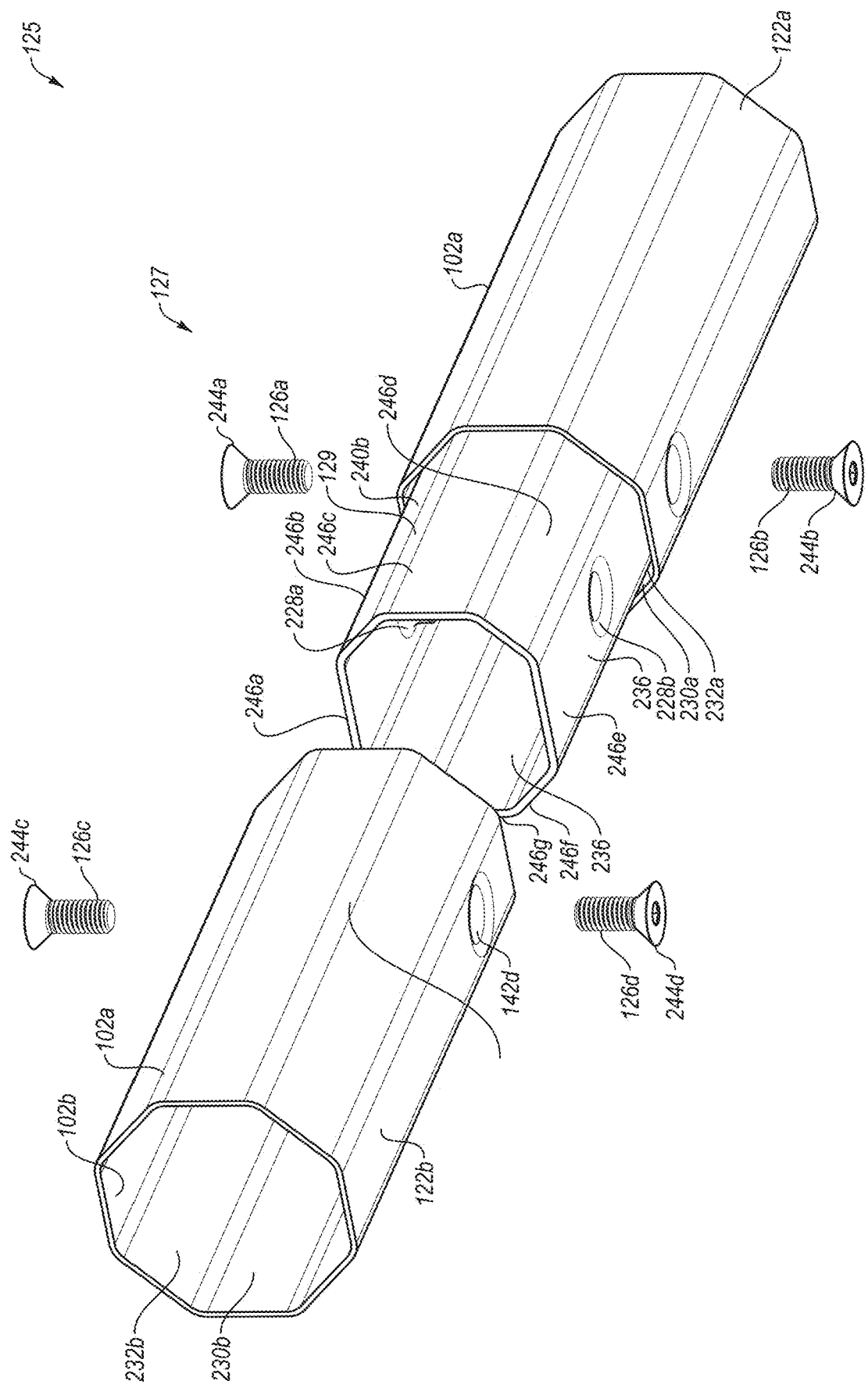
FIG. 2B illustrates a partially exploded bottom perspective view of the torque tube coupler and torque tube segments of FIG. 1.
Figure 2C:
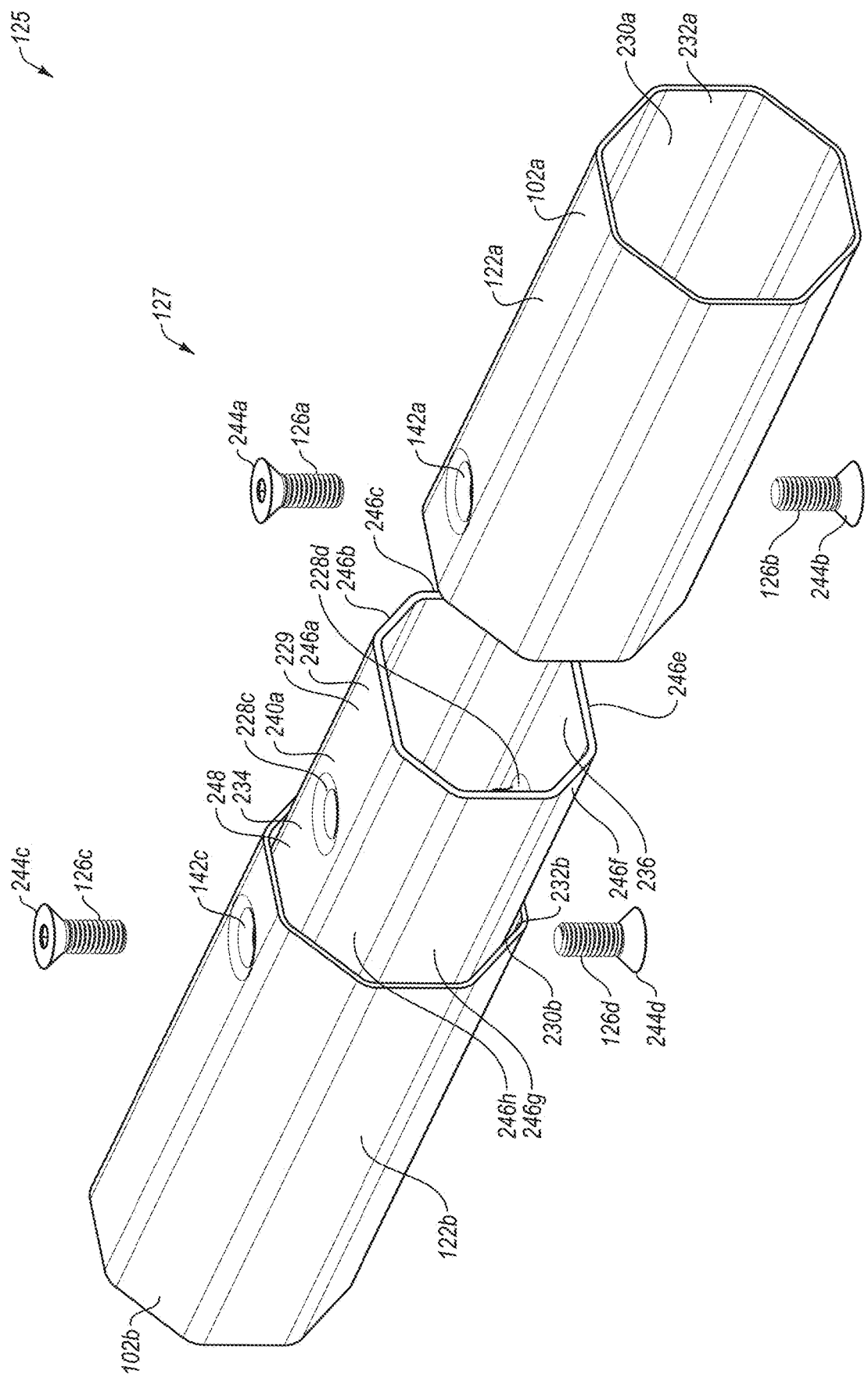
FIG. 2C illustrates another partially exploded top perspective view of the torque tube coupler and torque tube segments of FIG. 1.

The torque tube coupler 127 in FIG. 1 is positioned within portions of the torque tube segments 102a-b. Fasteners 126a-d (126b and 126d are illustrated in FIGS. 2A-2D) secure the torque tube segments 102a-b to the torque tube coupler 127. In particular, the fasteners 126a-d interface with countersunk openings 142a-d (142b and 142d are illustrated in FIG. 2B) of the torque tube segments 102a-b and a sleeve (such as denoted 229 in FIGS. 2A-2D) of the torque tube coupler 127 to secure the torque tube segments 102a-b to the sleeve of the torque tube coupler 127. The fasteners 126a-d may secure the torque tube segments 102a-b to the torque tube coupler 127 to form the torque tube 125.

The torque tube coupler 127 may couple to the torque tube segments 102a-b such that the torque tube segments 102a-b form a seam 120. The torque tube coupler 127, as shown in FIG. 1, may permit the torque tube segments 102a-b to abut each other such that external surfaces 122a-b of the torque tube segments 102a-b and the fasteners 126a-d form a flush external surface 124.

As can be seen in FIG. 1, the torque tube coupler 127 is at least partially enclosed within the torque tube segments 102a-b and does not extend away from the external surfaces 122a-b of the torque tube segments 102a-b. This permits the PV modules 112a-c, the torque tube interface 109, or any other appropriate solar installation component to be coupled anywhere along the length of the torque tube 125. The torque tube coupler 127 therefore may reduce or eliminate inefficiencies of the solar tracking system 100 by preventing constraints on where the PV modules 112a-c can be coupled to the torque tube 125. In addition, the torque tube coupler 127 does not constrain where the torque tube interface 109 can be coupled to the torque tube 125, which does not constrain where the support column 106 can be located.

The row 111 illustrated in FIG. 1 includes three PV modules 112a-c and two torque tube segments 102a-b. The row may include any appropriate number of PV modules and/or torque tube segments. For example, the row 111 may include one, two, three, four, or more PV modules. As another example, the row 111 may include two, three, four, five, or more torque tube segments. In the example shown, the torque tube segments 102a-b have an octagonal shape. However, the torque tube segments 102a-b may include any appropriate shape. For example, the shape of the torque tube segments 102a-b may include a square shape, a pentagonal shape, a hexagonal shape, a heptagonal shape, a nonagonal shape, a circular shape, or any other shape.

With further reference to FIG. 1 and FIGS. 2A-2D, the torque tube segments 102a-b are coupled together using the torque tube coupler 127 to form the torque tube 125. In the example shown, the torque tube coupler 127 includes the sleeve 229 and the fasteners 126a-d. The sleeve 229 may include a first region 240a that corresponds to the first torque tube segment 102a and a second region 240b that corresponds to the second torque tube segment 102b.

The sleeve 229 is sized to fit within portions of internal volumes 232a-b of the torque tube segments 102a-b. In particular, the first region 240a may fit within a portion of an internal volume 232a of the first torque tube segment 102a. In addition, the second region 240b may fit within a portion of an internal volume 232b of the second torque tube segment 102b. A perimeter of the sleeve 229 may be undersized compared to a perimeter of the torque tube segments 102a-b such that the internal volumes 232a-b of the torque tube segments 102a-b receive the regions 240a-b of the torque tube coupler 127.

The sleeve 229 may be sized such that at least a portion of an outer surface 234 of the sleeve 229 physically engages with portions of internal surfaces 230a-b of the torque tube segments 102a-b. At least a portion of surface sections 246a-h of the outer surface 234 of the sleeve 229 physically engage with the internal surfaces 230a-b of the torque tube segments 102a-b. For example, as shown in FIGS. 2A-2D, a second surface section 246b, a third surface section 246c, a fourth surface section 246d, a sixth surface section 246f, a seventh surface section 246g, and/or an eighth surface section 246h physically engage with the internal surfaces 230a-b of the torque tube segments 102a-b. In addition, when installed, the fasteners 126a-b may draw a first surface section 246a and a fifth surface section 246e of the sleeve 229 towards the countersunk openings 142a-d such that the first surface section 246a and/or the fifth surface section 246e physically engage with a portion of the countersunk openings 142a-d of the torque tube segments 102a-b.

The sleeve 229 may be sized to accommodate the countersunk openings 142a-d of the torque tube segments 102a-b to permit the sleeve 229 to fit between the countersunk openings 142a-d. Additionally or alternatively, the sleeve 229 may be sized and/or shaped such that gaps are formed between the sleeve 229 and the internal surfaces 230a-b of the torque tube segments 102a-b to accommodate the countersunk openings 142a-b. For example, a height of the sleeve 229 may be less than a width of the sleeve 229 to permit the sleeve 229 to fit between the countersunk openings 142a-d while still contacting at least portions of the internal surfaces 230a-b of the torque tube segments 102a-b on sides of the sleeve 229. Put another way, a length of the second surface section 246b, the fourth surface section 246d, the sixth surface section s246f, and the eighth surface section 246h may be smaller compared to a length of the third surface section 246c and the seventh surface section 246g to accommodate for the countersunk openings 142a-d extending out from the internal surfaces 230a-b of the torque tube segments 102a-b. In addition, a length of the first surface section 246a and the fifth surface section 246e may be greater compared to the length of the third surface section 246c and the seventh surface section 246g to accommodate the smaller lengths of the second surface section 246b, the fourth surface section 246d, the sixth surface section s246f, and the eighth surface section 246h. As another example, in embodiments in which the torque tube segments 102a-b include a circular shape, the sleeve 229 may include an oval shape such that gaps are formed between the sleeve 229 and the internal surfaces 230a-b of the torque tube segments 102a-b only proximate the countersunk recesses 142a-d.

In addition, the sleeve 229 includes openings 228a-d that are configured to receive the fasteners 126a-d. The openings 228a-d, when the sleeve 229 is disposed within the internal volumes 232a-b of the torque tube segments 102a-b, may be configured to be positioned proximate to corresponding countersunk openings 142a-d. For example, when the first region 240a of the sleeve 229 is disposed within a portion of the internal volume 232a of the first torque tube segment 102a, a first opening 228a and a second opening 228b may be configured to be positioned proximate a first countersunk opening 142a and a second countersunk opening 142b, respectively. As another example, when the second region 240b of the sleeve 229 is disposed within a portion of the internal volume 232b of the second torque tube segment 102b, a third opening 228c and a fourth opening 228d may be configured to be positioned proximate a third countersunk opening 142c and a fourth countersunk opening 142d, respectively. In the illustrated embodiment, the openings 228a-d of the sleeve 229 are shown as countersunk openings. However, it will be appreciated that the openings 228a-d may be through holes or any other appropriate flush hole. An example of the openings 228a-d including through holes that are positioned proximate nuts are discussed in more detail in relation to FIG. 3.

The first opening 228a and the third opening 228c are within the first surface section 246a of the sleeve 229. In addition, the second opening 228b and the fourth opening 228d are within the fifth surface section 246e of the sleeve 229. The first surface section 246a may be positioned opposite the first surface section 246a on the sleeve 229.

The openings 228a-d may receive the fasteners 126a-d via corresponding countersunk openings 142a-d. For example, the first opening 228a may receive a first fastener 126a via the first countersunk opening 142a, the second opening 228b may receive a second fastener 126b via the second countersunk opening 142b, the third opening 228c may receive a third fastener 126c via the third countersunk opening 142c, and the fourth opening 228d may receive a fourth fastener 126d via the fourth countersunk opening 142d.

The openings 228a-d may receive the fasteners 126a-d via corresponding countersunk openings 142a-d to couple the sleeve 229 to the torque tube segments 102a-b. For example, the first opening 228a may receive the first fastener 126a via the first countersunk opening 142a and the second opening 228b may receive the second fastener 126b via the second countersunk opening 142b to couple the sleeve 229 to the first torque tube segment 102a. As another example, the third opening 228c may receive the third fastener 126c via the third countersunk opening 142c and the fourth opening 228d may receive the fourth fastener 126d via the fourth countersunk opening 142d to couple the sleeve 229 to the second torque tube segment 102b. The fasteners 126a-d may include heads 244a-d that are shaped and sized to fit within the countersunk openings 142a-d.

In some embodiments, the openings 228a-d may be extruded by forming holes in the sleeve 229 and drawing material proximate the holes towards an internal volume 236 of the sleeve 229. In these and other embodiments, the openings 228a-d may include threaded or tapped portions (not illustrated) that are configured to interface with the fasteners 126a-d. For example, the threaded or tapped portions of the openings 228a-d may interface with threaded portions of the fasteners 126a-d. The threaded or tapped portions of the openings 228a-d may interface with threaded portions of the fasteners 126a-d to attach the fasteners 126a-d to the sleeve 229 and to couple the torque tube segments 102a-b to the sleeve 229. In some embodiments, the countersunk openings 142a-d may form smooth tapered openings.

The openings 228a-d may interface with the fasteners 126a-d such that rotating the fasteners 126a-d changes an amount that portions of the sleeve 229 are drawn towards the internal surfaces 230a-b of the torque tube segments 102a-b. For example, rotating the fasteners 126a-d in a clockwise direction may increase the amount the first surface section 246a and the fifth surface section 246e are drawn towards the internal surfaces 230a-b of the torque tube segments 102a-b. As another example, rotating the fasteners 126a-d in a counter-clockwise direction may reduce the amount the first surface section 246a and the fifth surface section 246e are drawn towards the internal surfaces 230a-b of the torque tube segments 102a-b.

In some embodiments, a length of the fasteners 126a-d may be sized such that rotating the fasteners 126a-d until the heads 244a-d are flush with the external surfaces 122a-b of the torque tube segments 102a-b indicate that proper torque has been applied to the fasteners 126a-d. In these and other embodiments, the fasteners 126a-d may be configured to be torqued to a threshold value. The threshold value may be equal to or between ten foot-pounds (ft-lbs.) and one hundred seventy-five ft-lbs. In some embodiments, the length of the fasteners 126a-d may be sized such that a portion of one or more of the fasteners 126a-d extend beyond the openings 228a-d within the internal volume 236 of the sleeve 229. In other embodiments, the length of the fasteners 126a-d may be sized such that a portion of one or more of the fasteners 126a-d are flush with the openings 228a-d. In some embodiments, rivets may be used instead of fasteners and the rivets may be configured to apply a proper pre-tension that applies tension axially when installed.

The sleeve 229 may include a unitary piece of metal 248 that is cut, punched, or otherwise removed from a single piece of pre-galvanized metal. The unitary piece of metal 248 may be cut from the single sheet of pre-galvanized metal such that a galvanization process penetrates the entire depth of the unitary piece of metal 248. Alternatively, the unitary piece of metal 248 may be galvanized after being formed. For example, the unitary piece of metal 248 may go through a hot dip galvanization process after being formed. The unitary piece of metal 248 may include a pre-galvanized metal comprising a thickness that permits the first opening and the second opening to be tapped during manufacture of the torque tube coupler.

In the example shown, the torque tube segments 102a-b have an octagonal shape. However, the torque tube segments 102a-b may include any appropriate shape. For example, the shape of the torque tube segments 102a-b may include a square shape, a pentagonal shape, a hexagonal shape, a heptagonal shape, a nonagonal shape, a circular shape, or any other shape.

The sleeve 229 may include a shape corresponding to the shape of the torque tube segments 102a-b. For example, as shown, the sleeve 229 has an octagonal shape that corresponds to the octagonal shapes of the torque tube segments 102*a-b*. However, the sleeve 229 may include any appropriate shape such as a square shape, a pentagonal shape, a hexagonal shape, a heptagonal shape, a nonagonal shape, a circular shape, or any other shape that corresponds to the shape of the torque tube segments 102*a-b*. For example, the torque tube segments 102*a-b* may include square shapes and the sleeve 229 may include a rectangular shape. As another example, the torque tube segments 102*a-b* may include circular shapes and the sleeve 229 may include an oval shape.

Figure 3:
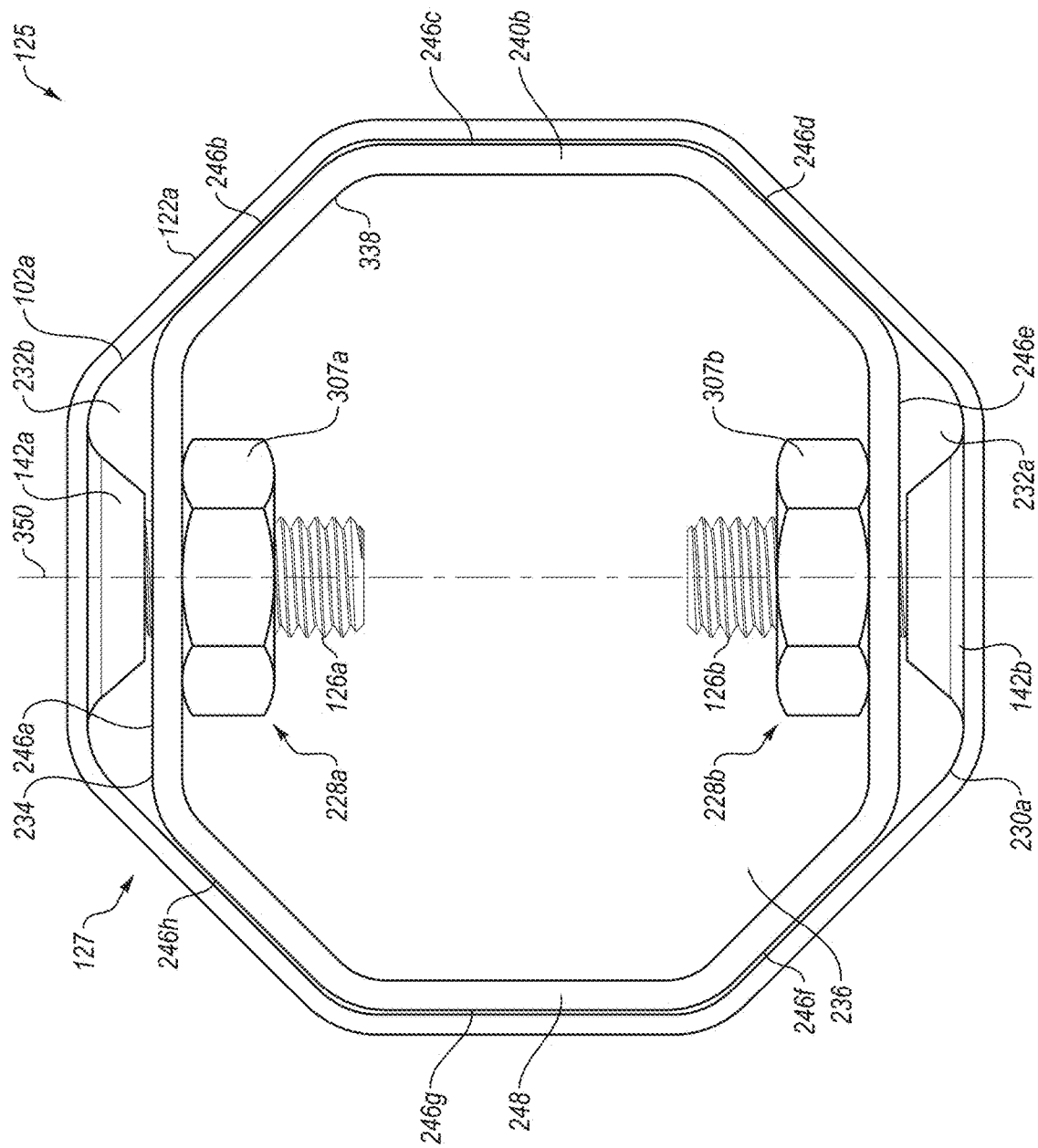
FIG. 3 illustrates a cross-sectional view of torque tube segments and an example torque tube coupler that includes nuts coupled to an interior surface of a sleeve of the torque tube coupler.

The openings 228*a-d* may be sized, shaped, and/or positioned within the sleeve 229 such that when the sleeve 229 is disposed within the internal volumes 232*a-b* of the torque tube segments 102*a-b*, one or more of the openings 228*a-d* are positioned proximate corresponding countersunk openings 142*a-d*. The sleeve 229 may be disposed within the internal volumes 232*a-b* of the torque tube segments 102*a-b* such that the openings 228*a-d* line up with the corresponding countersunk openings 142*a-d* (e.g., are coaxial). For example, as shown in FIG. 3, the first countersunk opening 142*a* may be coaxial with the first opening 228*a* along an axis 350. As another example, as shown in FIG. 3, the second countersunk opening 142*b* may be coaxial with the second opening 228*b* along the axis 350. Although not shown in FIG. 3, the third countersunk opening 142*c* may also be coaxial with the third opening 228*c* and the fourth countersunk opening 142*d* may also be coaxial with the fourth opening 228*d* along the axis 350.

In some embodiments, the fasteners 126*a-b* may include ⅜-inch bolts, half inch bolts, ⅝-inch bolts, or some combination thereof. In some embodiments, the fasteners 126*a-d* may include lengths such that a single fastener may extend across the internal volume 236 of the sleeve 229 and engage with the countersunk openings 142*a-d* and/or the openings 228*a-d* on an opposite side of the sleeve 229 and/or the torque tube segments 102*a-b*. For example, the first fastener 126*a* may include a length such that the first fastener 126*a* engages with the first countersunk opening 142*a* and the first opening 228*a*; extends across the internal volume 236 of the sleeve 229; and engages with the second opening 228*b* and the second countersunk opening 142*b*.

With reference to FIG. 3, the torque tube coupler 127 may include multiple nuts 307*a-b* proximate the openings 228*a-b* within the internal volume 236 of the sleeve 229. The nuts 307*a-b* may be coupled to an internal surface 338 of the sleeve 229. The nuts 307*a-b* may receive the fasteners 126*a-b* via the countersunk openings 142*a-b* and the openings 228*a-b*. The nuts 307*a-b* may interface with the fasteners 126*a-b* such that rotating the fasteners 126*a-b* changes an amount the nuts 307*a-b* are drawn towards the internal surface 338 of the sleeve 229. In addition, changing the amount the nuts 307*a-b* are drawn towards the internal surface 338 of the sleeve 229 may change the amount that the portions of the sleeve 229 are drawn towards the internal surfaces 230*a-b* of the torque tube segments 102*a-b*. The nuts 307*a-b* may include a rivet nut, a weld nut, a clinch nut, a pierce nut, a nylock nut, a nut paired with a locking half-nut, a capped nut, or some combination thereof. In some embodiments, the nuts 307*a-b* may be glued, brazed, or otherwise attached to the internal surface 338 of the sleeve 229. In FIG. 3, only two nuts 207*a-b* are illustrated as an example. The torque tube coupler 127 may include washers (not shown) positioned between the nuts 307*a-b* and the internal surface 338 of the sleeve 229. The washers may include a retention washer, a star washer, a spring washer, a bevel-spring washer, a serrated washer, or some combination thereof. The torque tube coupler 127 may include any appropriate number of nuts. In some embodiments, the number of nuts of the torque tube coupler 127 may correspond to a number of the openings 228*a-d*. For example, the torque tube coupler 127 may include four nuts, with a single nut proximate each of the openings 228*a-d*. Alternatively, the number of nuts may correspond only to a portion of the number of the openings 228*a-d*.

Figure 4:
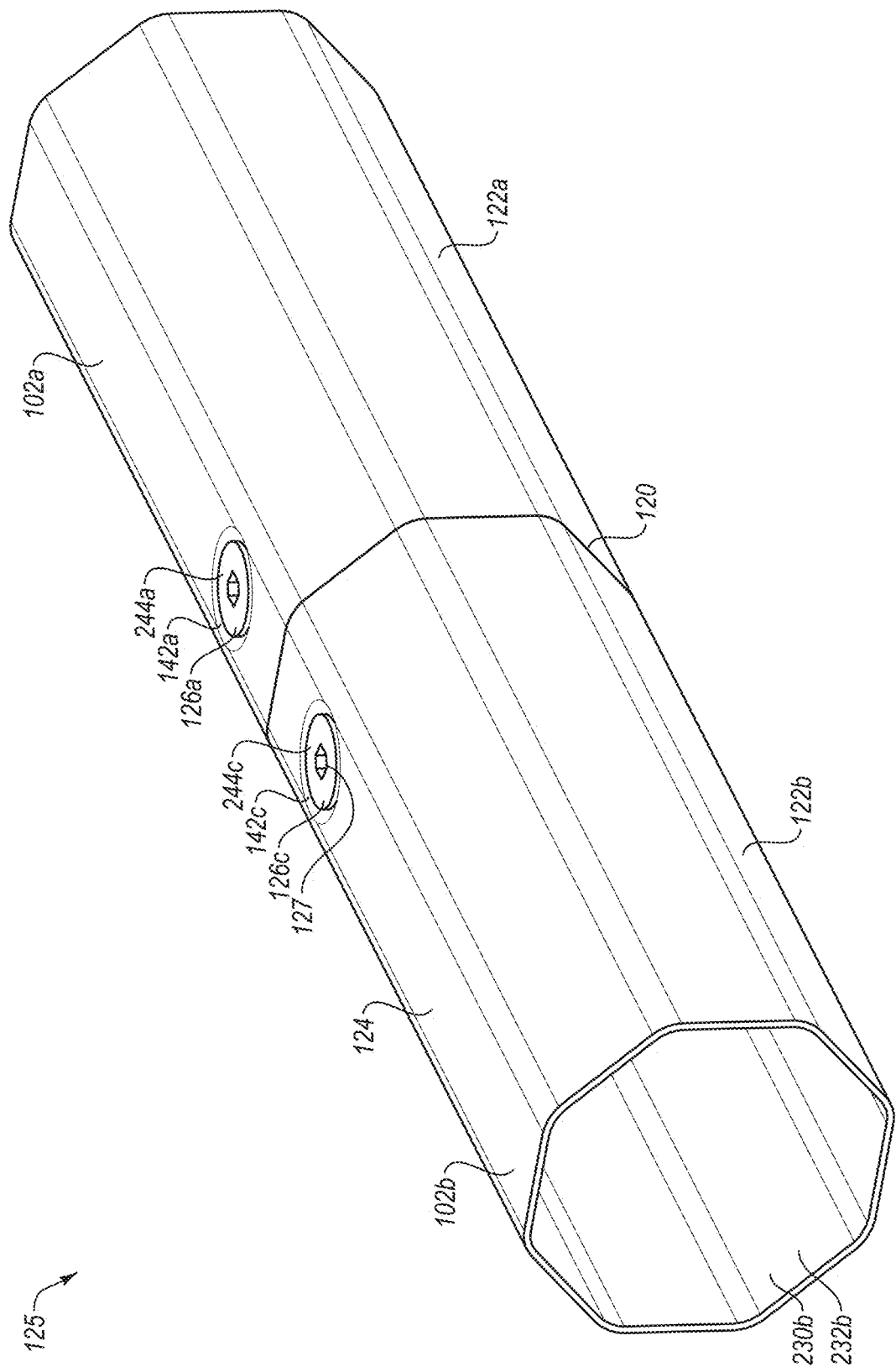
FIG. 4 illustrates a perspective view of the torque tube coupler and torque tube segments of FIG. 1 in an installed state.

With further reference to FIGS. 1-2D and FIG. 4, an example of the torque tube 125 in an installed state is shown. In the installed state, the torque tube segments 102*a-b* form the seam 120. In some embodiments, such as illustrated in FIG. 4, the torque tube coupler 127 may couple to the torque tube segments 102*a-b* such that the torque tube segments 102*a-b* contact (e.g., abut) each other and a width of the seam 120 is equal to zero millimeters (mm). In other embodiments, the torque tube coupler 127 may couple to the torque tube segments 102*a-b* such that the width of the seam 120 is greater than zero mm.

The torque tube coupler 127 may couple to the torque tube segments 102*a-b* such that the external surfaces 122*a-b* of the torque tube segment 102*a-b* form the flush external surface 124. In addition, the heads 244*a-d* of fasteners 126*a-d*, when installed, may be disposed within the countersunk openings 142*a-d* such that the heads 244*a-d* of the fasteners 244*a-d* are flush with the external surfaces 122*a-b* of the torque tube segments 102*a-b*. The external surface 122*a-b* of the torque tube segments 102*a-b* and the heads 244*a-d* of the fasteners 126*a-d* may form the flush external surface 124.

Figure 5:
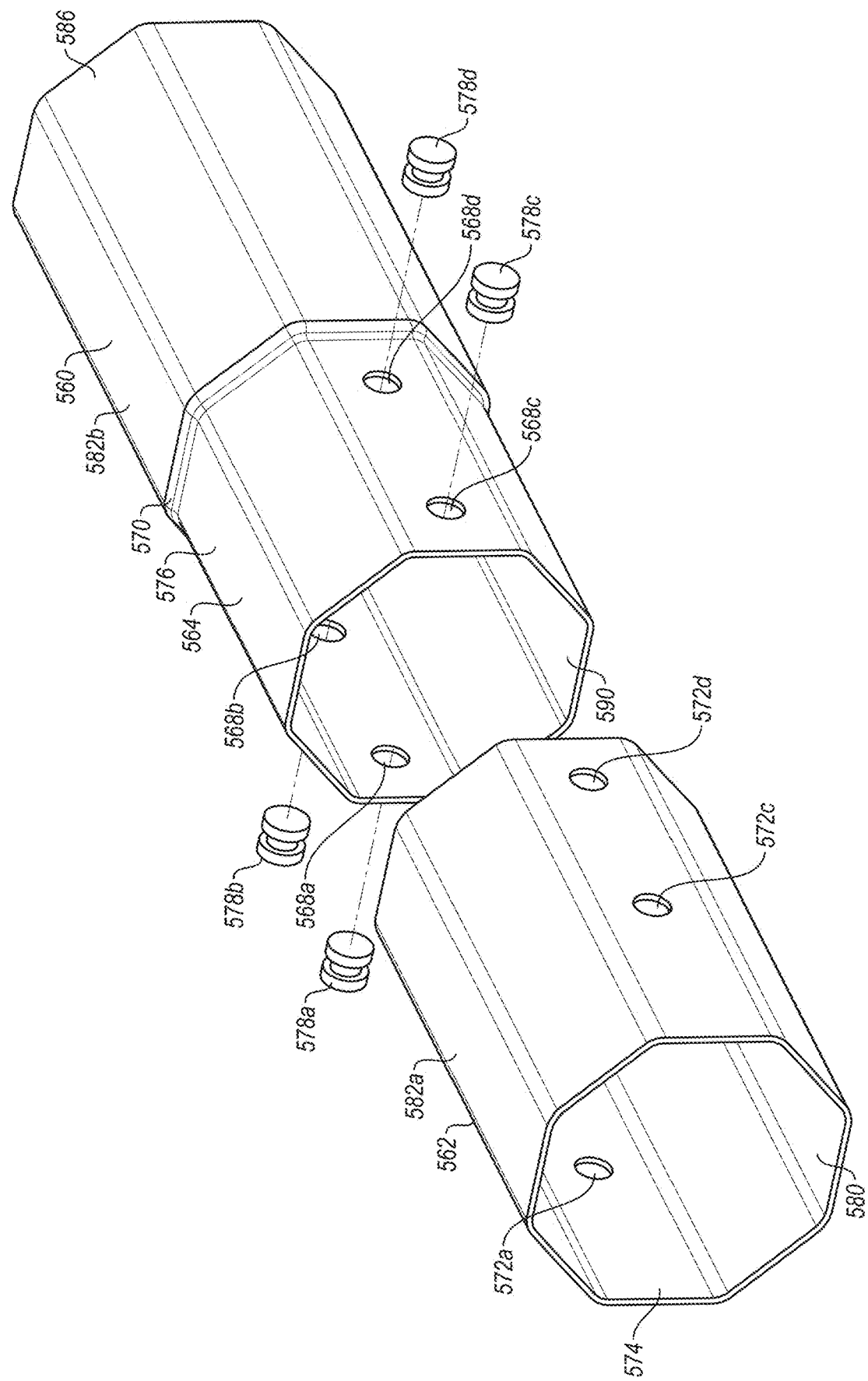
FIG. 5 illustrates a perspective view of an example torque tube segment including a swaged end and an example torque tube segment.

With reference to FIG. 5, an example torque tube segment 560 including a swaged end 564 and an example torque tube segment 562 is shown. The torque tube segment 560 may be coupled to the torque tube segment 562 via the swaged end 564 and fasteners 578*a-d* to form a torque tube. The torque tube segment 560 and the torque tube segment 562 may operate similarly to the torque tube segments 102*a-b* and the sleeve 229 of FIGS. 1-4. However, the torque tube segment 560 may include a unitary piece of metal that undergoes a swaging process to form the swaged end 564 that is used to couple the torque tube segment 560 to the torque tube segment 562. In addition, the swaged end 564 may couple to the torque tube segment 562 such that the external surfaces 582*a-b* of the torque tube segments 560 and 562 form a flush external surface.

During the swaging process, the unitary piece of metal may be deformed to form the swaged end 564. In addition, during the swaging process, openings 568*a-d* may be cut and/or formed in the swaged end 564.

The swaged end 564 may be sized to fit within a portion of an internal volume 580 of the torque tube segment 562. A perimeter of the swaged end 564 may be undersized compared to a perimeter of the torque tube segment 562 such that the internal volume 580 of the torque tube segment 562 receives the swaged end 564. In addition, the swaged end 564 may be sized such that at least a portion of an outer surface 576 of the swaged end 564 physically engages with at least a portion of an internal surface 574 of the torque tube segments 562.

The torque tube segment 560 may include a transition region 570 that connects the swaged end 564 to a raised region 586. The raised region 586 may include a perimeter that is greater than the perimeter of the swaged end 564. Likewise, the raised region 586 may include a perimeter that corresponds to a perimeter of the torque tube segment 562 to form the flush external surface. The transition region 570 may include a sloped surface or other transitional surface that transitions between the different sized perimeters of the swaged end 564 and the raised region 586.

The transition region 570 may interface with an end of the torque tube segment 562 to prevent the swaged end 564 from being over inserted into the internal volume 580 of the torque tube segment 562. In addition, the raised region 586 may interface with the end of the torque tube segment 562 to align the openings 568a-d of the swaged end 564 relative to openings 572a-d of the torque tube segment 562. For example, the transition region 570 may be positioned so as to prevent the swaged end 564 from being over inserted into the internal volume 580 of the torque tube segment 562 to prevent the openings 568a-d from being inserted beyond the openings 572a-d of the torque tube segment 562.

The openings 568a-d of the swaged end 564, when the swaged end 564 is disposed within the internal volume 580 of the torque tube segment 562, may be configured to be positioned proximate to the corresponding openings 572a-d of the torque tube segment 562. For example, when the swaged end 564 is disposed within a portion of the internal volume 580 of the torque tube segment 562, the opening 568a and the opening 568b may be configured to be positioned proximate the opening 572a and the opening 572b, respectively. As another example, when the swaged end 564 is disposed within a portion of the internal volume 580 of the torque tube segment 562, the opening 568c and the opening 568d may be configured to be positioned proximate the opening 572c and the opening 572d, respectively. Opening 572b is not shown in FIG. 5 but would be positioned across from opening 572d.

In the illustrated embodiment, the openings 568a-d of the swaged end 564 are shown as through holes. However, it will be appreciated that the openings 568a-d may be countersunk openings or any other appropriate hole.

The openings 568a-d may receive the fasteners 578a-d via corresponding openings 572a-d of the torque tube segment 562 to couple the swaged end 564 to the torque tube segment 562. The fasteners 578a-d may include blind fasteners or any other type of fastener that is configured to connect to the swaged end 564 and the torque tube segment 562 without access to an internal volume 590 of the swaged end 564 due to a length of the torque tube segment 562. For example, the length of the torque tube segment 562 may prevent access to the fasteners within the internal volume 590 of the swaged end 564 when the swaged end 564 is disposed within the internal volume 580 of the torque tube segment 562.

When installed, the fasteners 578a-d may draw corresponding portions of the swaged end 564 towards the internal surface 574 of the torque tube segment 562 such that at least a portion of an outer surface 576 of the swaged end 564 physically engages with at least a portion of the internal surface 574 of the torque tube segment 562.

The torque tube segments 560 and 562 may include unitary pieces of metal that are cut, punched, or otherwise removed from single pieces of pre-galvanized metal. Alternatively, the unitary pieces of metal may be galvanized after being formed. For example, the unitary pieces of metal may go through a hot dip galvanization process after being formed. The unitary pieces of metal may include a thickness such that the openings 568a-d of the swaged end 564 and the openings 572a-d of the torque tube segment 562 may be formed and tapped. For example, the unitary pieces of metal may include a thickness equal to fourteen-gauge metal material.

In the example shown, the torque tube segments 560 and 562 have an octagonal shape. However, the torque tube segments 560 and 562 may include any appropriate shape. For example, the shape of the torque tube segments 560 and 562 may include a square shape, a pentagonal shape, a hexagonal shape, a heptagonal shape, a nonagonal shape, a circular shape, or any other shape.

The swaged end 564 may include a shape corresponding to the shape of the torque tube segment 562. For example, as shown, the swaged end 564 has an octagonal shape that corresponds to the octagonal shape of the torque tube segment 562. However, the swaged end 564 may include any appropriate shape such as a square shape, a pentagonal shape, a hexagonal shape, a heptagonal shape, a nonagonal shape, a circular shape, or any other shape that corresponds to the shape of the torque tube segment 562. For example, the torque tube segment 562 may include a square shape and the swaged end 564 may include a rectangular shape. As another example, the torque tube segment 562 may include a circular shape and the swaged end 564 may include an oval shape.

Figure 6:
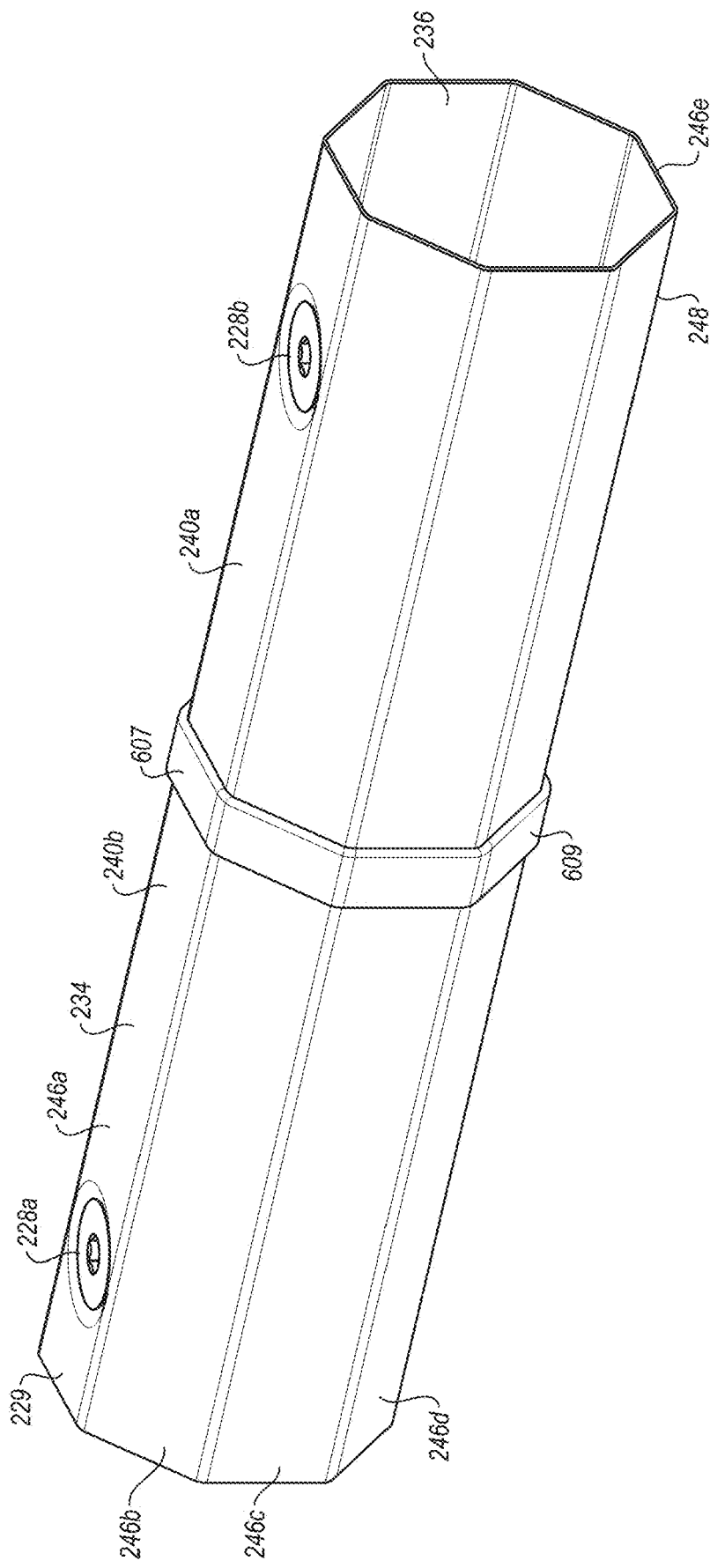
FIG. 6 illustrates an example of the sleeve including a collar.

With reference to FIG. 6, an example of the sleeve 229 including a collar 607 is shown. In some embodiments, the collar 607 may be sized and shaped such that an external surface 609 of the collar 607 and the external surfaces 122a-b of the torque tube segments 102a-b form a flush external surface. In particular, a thickness of the collar 607 may be sized such that the external surface 609 of the collar 607 and the external surfaces 122a-b of the torque tube segments 102a-b form the flush external surface 124. The collar 607 may selectively contact a portion of the outer surface 234 of the sleeve 229. Alternatively, the collar 607 may be permanently coupled to or otherwise form part of the sleeve 229.

The collar 607 may be configured to be disposed between the torque tube segments 102a-b. The collar 607 may be sized to assist in aligning the openings 228a-d with the countersunk openings 142a-d. For example, the collar 607 may be positioned so as to prevent the regions 240a-b of the sleeve 229 from being over inserted into the internal volumes 232a-b of the torque tube segments 102a-b to prevent the openings 228a-d from being inserted beyond the countersunk openings 142a-d.

Thus, the sleeve 229 fits within the internal volumes 232a-b of the torque tube segments 102a-b and the torque tube coupler 127 couples the torque tube segments 102a-b together without constraining where the PV modules 112a-c can be coupled to the torque tube 125, which eliminates the inefficiencies of solar installations. In addition, the swaged end 564 fits within the internal volume 580 of the torque tube segment 562 and the swaged end 564 couples the torque tube segments 560 and 562 together without constraining where PV modules can be coupled to the torque tube segments 560 and 562, which also eliminates the inefficiencies of solar installations.

What is claimed is:

1. A torque tube coupler coupling assembly comprising:
a first torque tube segment that includes a first external surface, a first internal surface, and a first countersunk opening that extends through the first external and internal surfaces, wherein the first countersunk opening is formed such that at least a portion of the first internal surface that surrounds the first countersunk opening extends into a first interior space that is defined by the first internal surface;
a second torque tube segment that includes a second external surface, a second internal surface, and a second countersunk opening that extends through the second external and internal surfaces, wherein the second countersunk opening is formed such that at least a portion of the second internal surface that surrounds the second countersunk opening extends into a second interior space that is defined by the second internal surface;

a sleeve comprising:
an outer surface configured to physically engage with portions of the first and second internal surfaces of the first and second torque tube segments;
a first opening configured to be positioned proximate the first countersunk opening of the first torque tube segment; and
a second opening configured to be positioned proximate the second countersunk opening of the second torque tube segment, the first opening and the second opening being configured to receive fasteners via the first countersunk opening and the second countersunk opening to couple the first torque tube segment and the second torque tube segment to the sleeve.

2. The torque tube coupling assembly of claim 1, wherein:
the first torque tube segment includes a third countersunk opening, wherein the third countersunk opening is formed such that at least a portion of the first internal surface that surrounds the third countersunk opening extends into the first interior space;
the second torque tube segment includes a fourth countersunk opening, wherein the fourth countersunk opening is formed such that at least a portion of the second internal surface that surrounds the second countersunk opening extends into the second interior space;
the sleeve includes a third opening within a different surface section of the sleeve than a surface section of the sleeve that includes the first opening, the third opening configured to be positioned proximate the third countersunk opening of the first torque tube segment; and
the sleeve includes a fourth opening within the different surface section of the sleeve than a surface section of the sleeve that includes the second opening, the fourth opening configured to be positioned proximate the fourth countersunk opening of the second torque tube segment, wherein the third opening and the fourth opening are configured to receive additional fasteners via the third countersunk opening and the fourth countersunk opening to further couple the first torque tube segment and the second torque tube segment to the sleeve.

3. The torque tube coupling assembly of claim 2, wherein:
the third opening is within a surface section of the sleeve opposite the surface section of the sleeve that includes the first opening; and
the fourth opening within a surface section of the sleeve that is opposite the surface section of the sleeve that includes the second opening.

4. The torque tube coupling assembly of claim 1, wherein the first opening and the second opening comprise threaded portions configured to interface with the fasteners to attach the fasteners to the sleeve.

5. The torque tube coupling assembly of claim 1 further comprising:
a first nut coupled to an internal surface of the sleeve proximate the first opening; and
a second nut coupled to the internal surface of the sleeve proximate the second opening, wherein the first nut and the second nut are configured to receive the fasteners via the first opening and the second opening and to interface with the fasteners to attach the fasteners to the sleeve.

6. The torque tube coupling assembly of claim 1, wherein the first opening and the second opening are configured to receive the fasteners such that rotating the fasteners draws portions of the sleeve towards the first and second internal surfaces of the first and second torque tube segments.

7. The torque tube coupling assembly of claim 1, wherein the first opening and the second opening are within a same surface of the sleeve.

8. The torque tube coupling assembly of claim 1, wherein the sleeve is sized to fit within the first and second interior spaces such that a portions of the outer surface of the sleeve physically engage portions of the first and second internal surfaces.

9. The torque tube coupling assembly of claim 1, wherein the first opening, the second opening, the first countersunk opening, and the second countersunk opening are positioned such that, when the first torque tube segment and the second torque tube segment are coupled to the sleeve, the first torque tube segment and the second torque tube segment contact each other.

10. The torque tube coupling assembly of claim 1, wherein the sleeve further comprises a collar having a size and shape such that an external surface of the collar and the external surfaces of the first and second torque tube segments form a flush external surface.

11. The torque tube coupling assembly of claim 1, wherein the first countersunk opening and the second countersunk opening form smooth tapered openings.

12. A torque tube coupling assembly comprising:
a first torque tube segment that includes an external surface, an internal surface, and a countersunk opening that extends through the external and internal surfaces, wherein the countersunk opening is formed such that at least a portion of the internal surface that surrounds the countersunk opening extends into an interior space that is defined by the internal surface;
a second torque tube segment including a swaged end comprising:
an outer surface configured to physically engage with a portion of the internal surface of the first torque tube segment;
an opening configured to be positioned proximate the countersunk opening of the first torque tube segment, the first opening being configured to receive a fastener via the countersunk opening to couple the first torque tube segment to the second torque tube segment.

13. The torque tube coupling assembly of claim 12, wherein the opening comprises a threaded portion configured to interface with a fastener to couple the first torque tube segment to the second torque tube segment.

14. The torque tube coupling assembly of claim 12 further comprising:
a nut coupled to an internal surface of the second torque tube segment proximate the first opening, wherein the nut is configured to interface with a fastener to couple the first torque tube segment to the second torque tube segment.

15. The torque tube coupling assembly of claim 12, wherein the opening is configured to receive a fastener such that rotating the fastener draws portions of the second torque tube segment towards the internal surface of the first torque tube segment.

16. The torque tube coupling assembly of claim 12, wherein the swaged end is sized to fit within the interior space such that a portions of the outer surface of the second torque tube segment physically engage portions of the internal surface of the first torque tube segment.

17. The torque tube coupling assembly of claim 12, wherein the countersunk opening forms a smooth tapered opening.

* * * * *